S. M. WILLIAMS.
COMBINED BABY CARRIER AND ROBE RAIL FOR AUTOMOBILES.
APPLICATION FILED OCT. 25, 1915.

1,200,405.

Patented Oct. 3, 1916.
2 SHEETS—SHEET 1.

Witnesses

Inventor
S. M. Williams
By C. L. Parker, Attorney

S. M. WILLIAMS.
COMBINED BABY CARRIER AND ROBE RAIL FOR AUTOMOBILES.
APPLICATION FILED OCT. 25, 1915.

1,200,405.

Patented Oct. 3, 1916.
2 SHEETS—SHEET 2.

Witnesses
Wynne Johnson

Inventor
S. M. Williams.
By
C. L. Parker, Attorney

UNITED STATES PATENT OFFICE.

SAMUEL M. WILLIAMS, OF LIMA, OHIO.

COMBINED BABY-CARRIER AND ROBE-RAIL FOR AUTOMOBILES.

1,200,405.

Specification of Letters Patent.

Patented Oct. 3, 1916.

Application filed October 25, 1915. Serial No. 57,771.

*To all whom it may concern:*

Be it known that I, SAMUEL M. WILLIAMS, a citizen of the United States, residing at Lima, in the county of Allen and State of Ohio, have invented certain new and useful Improvements in Combined Baby-Carriers and Robe-Rails for Automobiles, of which the following is a specification.

My invention relates to a combined baby carrier and robe rail for automobiles or other vehicles.

An important object of the invention is to provide an apparatus of the above mentioned character, formed of parts which may be readily collapsed to serve as a robe rail, and distended or assembled to serve as a baby carrier or support.

A further object of the invention is to provide apparatus of the above mentioned character, which is simple in construction, inexpensive to manufacture, and convenient in use.

Other objects and advantages of the invention will be apparent during the course of the following description.

Figure 1:
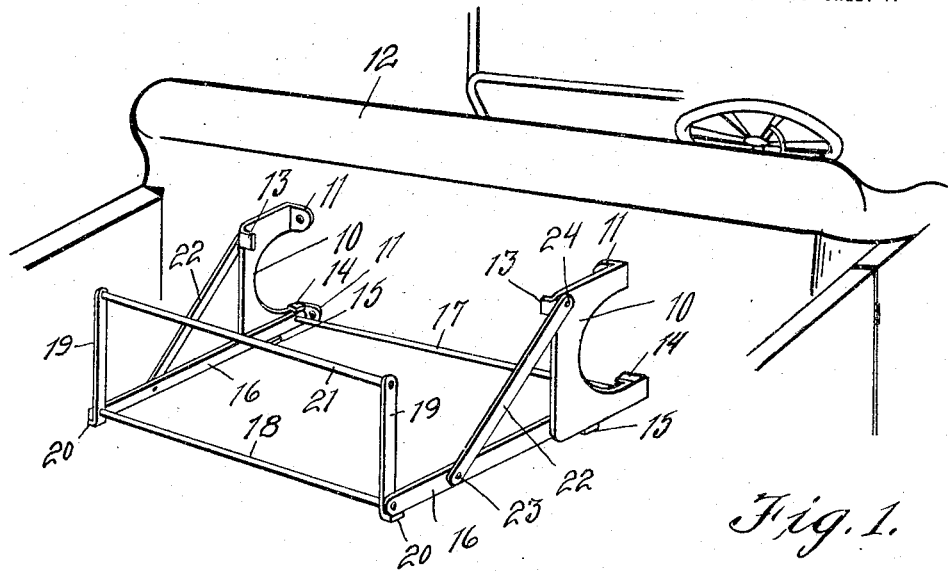
Figure 2:
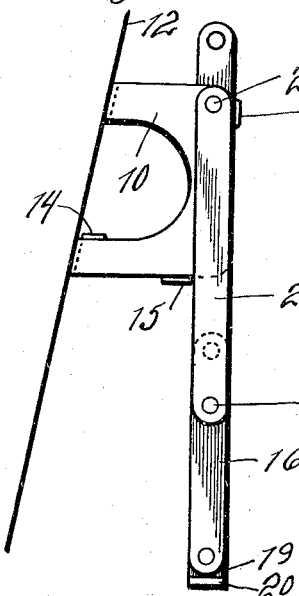
Figure 3:
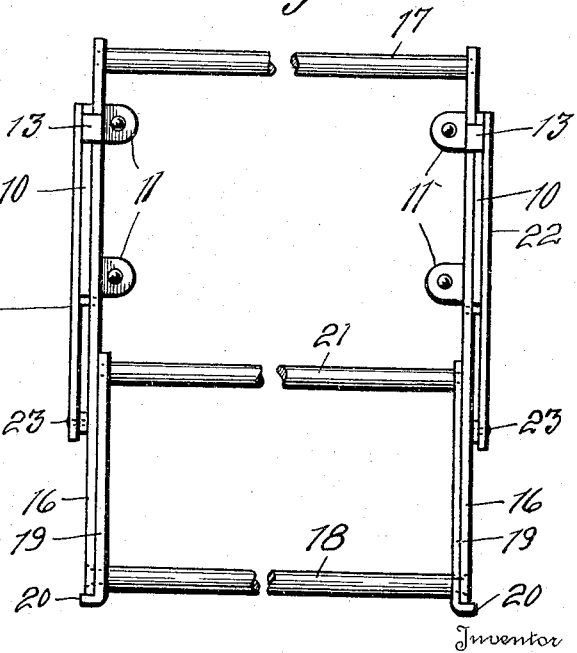
Figure 4:
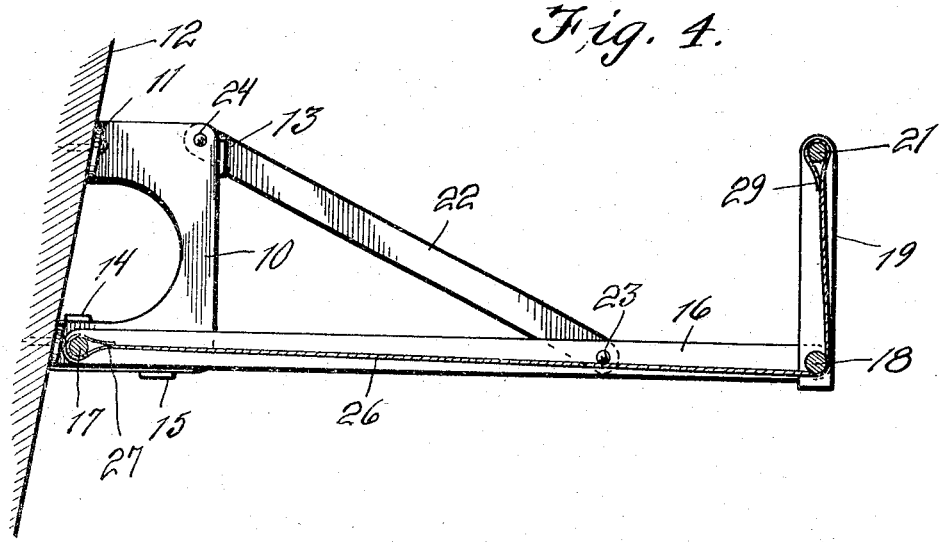
Figure 5:
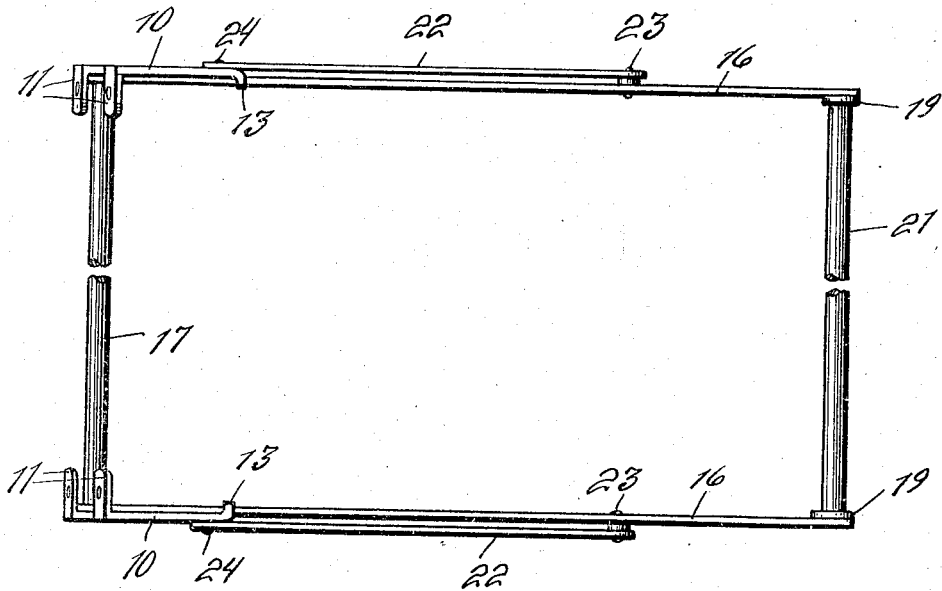

In the accompanying drawings forming a part of this specification and in which like numerals are employed to designate like parts throughout the same, Figure 1 is a perspective view of apparatus embodying the invention, Fig. 2 is an edge elevation of the apparatus, collapsed, and serving as a robe rail, Fig. 3 is a side elevation of the same, Fig. 4 is a central vertical longitudinal sectional view through the apparatus, assembled and serving as a baby carrier, and Fig. 5 is a plan view of the same.

In the drawings, wherein for the purpose of illustration is shown a preferred embodiment of my invention, the numeral 10 designates attaching brackets, having apertured feet 11, contacting with the rear side of the front seat 12 of an automobile and rigidly secured thereto. These brackets are provided near their upper ends with vertical stop lugs or ears 13, preferably formed integral therewith. At their lower ends the brackets 10 are provided with upper and lower horizontal stop lugs 14 and 15, extending inwardly, as shown. The function of these lugs will be apparent hereinafter.

The apparatus comprises a main frame embodying side bars or strips 16, corresponding ends of which are connected by a rod or rail 17. The opposite corresponding ends of the bars or strips 16 are connected by a rod or rail 18, upon the ends of which are pivotally mounted end bars 19, disposed inwardly of the bars or strips 16, and adapted to fold within the same. At their ends, adjacent their pivots, the end bars 19 are provided with lateral extensions 20, adapted to engage beneath the bars 16, and to limit the outward movement of the bars 19 when they have assumed a vertical position, as indicated in Fig. 1. These lateral extensions 20, however, do not interfere with the inward swinging movement of the end bars 19. The ends of the bars 19 are connected by a rod or rail 21, as shown.

Disposed upon the outer sides of the bars 16, and pivotally connected therewith between their ends are diagonal braces 22, as shown at 23. These diagonal braces are pivotally connected, as shown at 24, with the upper ends of the brackets 10 and are disposed outwardly thereof.

The numeral 26 designates a flexible bottom or covering 26, for the apparatus, one end of which is provided with a hem 27, receiving the rod 17. This flexible bottom, which may be formed of canvas or the like, is passed about the outer side of the rod 18, and is provided at its opposite end with a hem 29 to receive the rod 21. The flexible bottom 26 is made sufficiently slack or elastic so that it will permit of the bars 19 being swung inwardly to assume a position parallel with the bars 16.

When the apparatus is being used as a robe rail, the bars 16 assume a substantial vertical position, their upper portions being arranged inwardly of and contacting with the vertical stop lugs 13, while their intermediate portions are disposed outwardly of and contact with the lower horizontal stop lugs 15, as clearly illustrated in Fig. 2. In this manner these bars 16 are held in the vertical position and the rail or rod 17 is horizontally arranged to receive thereon a robe or the like. The end bars 19 are folded in to extend parallel with the bars 16. When it is desired to use the apparatus as a baby carrier, the lower ends of the bars 16 are swung upwardly, whereby their upper ends move downwardly, in proximity to the lugs 14 and 15. By a slight rearward longitudinal movement of the bars 16, their forward ends will clear the upper horizontal lugs 14, and by a reverse longitudinal movement of the bars 16, such forward ends of the bars 16 may be inserted between the pairs of lugs 14 and 15, as clearly illustrated in Fig. 4. When this is done, these lugs, together with the diagonal braces 22, securely retain the bars 16 in a horizontal position. The end bars 19 are now swung upwardly to assume the vertical position. The apparatus will then be ready for use, the diagonal braces 22 serving more or less as sides for the carrier.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described the invention, I claim:

1. A combined baby carrier and robe rail, comprising attaching brackets, a frame comprising connected longitudinal bars having corresponding ends detachably connected with the brackets, end bars pivotally connected with the corresponding outer ends of the longitudinal bars, a flexible bottom carried by the frame and end bars, and diagonal braces connected with the longitudinal bars and the brackets.

2. A combined baby carrier and robe rail, comprising attaching brackets provided with pairs of spaced stop members, a pair of longitudinal bars adapted to have corresponding ends inserted between the pairs of stop members, rods connecting the ends of the longitudinal bars, and diagonal braces permanently pivotally connected with the longitudinal bars and permanently pivotally connected with the attaching brackets.

3. A combined baby carrier and robe rail for a vehicle, comprising a body member adapted when horizontally arranged to serve as a support for a baby and when vertically arranged to serve as a robe rail, brackets attached to the vehicle and having means for detachably engaging with one end of the body member, diagonal braces pivotally connected with the body member between its ends and extending upwardly beyond the same to serve as side guards and having pivotal connection with the upper portions of the brackets, and a foot member pivoted to the free end of the body member and adapted to be angularly adjusted with relation thereto.

In testimony whereof I affix my signature in presence of two witnesses.

SAMUEL M. WILLIAMS.

Witnesses:
 E. P. HUGHES,
 FRED W. CURTIS.

Copies of this patent may be obtained for five cents each, by addressing the "Commissioner of Patents, Washington, D. C."